United States Patent Office 3,830,794
Patented Aug. 20, 1974

3,830,794
PROCESS FOR THE PREPARATION OF A
CARBOXYLIC ACID AMIDE
Teruaki Mukaiyama, Masaaki Ueki, Rei Matsueda, and Hiroshi Maruyama, Tokyo, Japan, assignors to Sankyo Company Limited
No Drawing. Original application Nov. 17, 1970, Ser. No. 90,419, now Patent No. 3,737,423. Divided and this application Dec. 18, 1972, Ser. No. 316,013
Int. Cl. C07c 103/00, 103/20, 103/52
U.S. Cl. 260—112.5     6 Claims

ABSTRACT OF THE DISCLOSURE

An improved and novel process for the preparation of a carboxylic acid amide which comprises reacting a carboxylic acid with an organic amine or a sulfenic acid with an organic amine or a sulfenic acid amide thereof in the presence of a tertiary phosphine and a disulfide of a mercaptoheterocyclic compound containing a nitrogen-carbon double bond with which the disulfide linkage is conjugated.

---

This is a division of application Ser. No. 90,419, filed Nov. 17, 1970, now U.S. Pat. No. 3,737,423.

This invention relates to an improved and novel process for the preparation of a carboxylic acid amide.

Various studies have been made heretofore for the preparation of a carboxylic acid amide. The processes which have been most widely accepted include a process which comprises reacting a reactive derivative of a carboxylic acid, e.g. and acid halide, an acid anhydride, etc. with an organic amine, and a process which comprises condensing a carboxylic acid with an organic amine in the presence of a strong dehydrating agent, e.g. carbodiimide, etc. However, these prior art processes suffer from several disadvantages. For instance, where a carboxylic acid having a complicated structure is used as a starting material, the preparation of the reactive derivative of a carboxylic acid is often difficult, and where an optically active compound such as an amino acid or a peptide of natural origin is used as a starting material, the resulting product may lose optical activity as the consequence of side reaction.

As a result of various investigations into a process which may be conducted under mild reaction conditions without side reaction and may be widely applied to the preparation of the carboxylic acid amide, we have already developed some processes and succeeded to obtain optically pure desired compounds in excellent yield from an optically active compound. According to the prior processes, the carboxylic acid amide is prepared by reacting a carboxylic acid with an organic amine in the presence of a tertiary phosphine, a metal compound and a disulfide or a sulphenyl halide and a base (Japanese Patent Application Nos. 19,269/68 and 85,890/68) or in the presence of a tertiary phosphine, a halogen and a base (74,921/68) or reacting a carboxylic acid with a sulphenic acid amide in the presence of a tertiary phosphine and an organic metal compound (85,888/68). However, these processes have some disadvantages. For instance, the presence of the metal compound is disadvantageous when the starting material or the desired product tends to form fixed chelate compounds with metal or when the presence of insolubles obstructs a reaction, for example, in case of the preparation of polyamide by a solid phase method which has been recently developed. And, the presence of the halogen is also disadvantageous when the starting material or the desired product contains a group highly reactive to halogen, such as tyrosine or tryptophan. It is, therefore, an object of this invention to provide a novel and improved process for the preparation of carboxylic acid amide, which may be applied to various amido-formation without any obstructions as above.

Another object of this invention is to provide a novel and improved process for the synthesis of a peptide.

Other objects of this invention will be apparent from the following detailed description.

According to the present invention, carboxylic acid amides can be prepared by reacting a carboxylic acid with an organic amine or a sulfenic acid amide thereof in the presence of a tertiary phosphine and a disulfide of a mercaptoheterocyclic compound containing a nitrogen-carbon double bond with which the disulfide linkage is conjugated.

One of the starting materials used in the process of the present invention is a carboxylic acid which may be aliphatic, aromatic or heterocyclic. The kind and type of aliphatic, aromatic or heterocyclic carboxylic acids are not critical, and one may satisfactorily employ as a starting material any carboxylic acids, for example, saturated or unsaturated, straight or branched or long- or short-chain aliphatic carboxylic acids; aromatic monocyclic or polycyclic carboxylic acids which may carry any substituent in the aromatic ring; heterocyclic carboxylic acids with 5- or 6-membered or condensed heterocyclic ring and the like.

The other starting material is an organic amine or a sulfenic acid amide which may be an aliphatic, aromatic, heterocyclic amine or an alkyl- or aryl-sulfenic acid amide thereof. The arylsulfenic acid amides employed in this invention are those substituted or unsubstituted with a nitro group or a halogen atom in the benzene ring. Especially, a nitro-substituted benzene sulfenic acid amide is preferable. In the present invention, when an amino acid is used as a starting material, there may be obtained peptides.

If the starting compound used has a reactive functional group such as —COOH, —NH$_2$, —NH—, —SH or —OH as an optional substituent which will not take part in the reaction, it is desirable to block the said functional group with a protecting group which may be easily removed after the intended reaction. For example, a carboxyl group can be protected in the form of an ester, e.g. lower alkyl or benzyl ester, an amino group can be protected by an acyl group, e.g. formyl, trifluoroacetyl, benzyloxycarbonyl, tert.-butoxycarbonyl, tert.-amyloxycarbonyl, nitrobenzenesulfenyl, etc. or a substituted alkenyl group, e.g., 1-methyl-2-acetylvinyl, 1-methoxycarbonyl-1-propenyl, etc. Imino, mercapto and hydroxy groups can be protected by a benzyl, benzyloxycarbonyl or tetra-hydropyranyl group.

Other protecting groups which are commonly known in the art of peptide chemistry are also usable. If such protecting groups are used, the present invention is applicable to the amido-formation reaction in the peptide synthesis. For instance, the present invention is applicable to the synthesis of peptide-type antibiotics such as penicillin, cephalosphorin and polymyxin, short-chain peptides such as glutathione and oxytocin and long-chain peptides such as insulin and adrenocorticotropine.

In accordance with the process of the present invention, the above-referred starting compounds are contacted with the tertiary phosphine and the disulfide in a suitable solvent. As the tertiary phosphine employed in this invention, there may be used any tertiary phopshine substituted with a substituted or unsubstituted aliphatic and aromatic hydrocarbon without specific restriction. Usually, there may be used an easily available and stable tertiary phosphine containing the same kind of the hydrocarbonyl group such as tributyl phosphine and triphenyl phosphine.

The disulfide used in the present invention is a disulfide of a mercaptoheterocyclic compound containing a nitrogen-carbon double bond with which the disulfide linkage is conjugated and may be symmetric or asymmetric. Representative examples of the disulfide include a disulfide of a 6-membered mercaptoheterocyclic compound containing one or more nitrogen atom as a hetero atom and a condensed ring derivative thereof such as 2,2'-dipyrimidinyl disulfide, 4,4'-dipyridyl disulfide, 2,2'-diquinolyl disulfide, 2,2'-dipyrazinyl disulfide, 2,2'-dipyrimidinyl disulfide, 2,2'-diquinoxalinyl disulfide, 4,4'-diquinazolinyl disulfide and 6,6'-diacridinyl disulfide and a disulfide of a 5-membered mercaptoheterocyclic compound containing one or more nitrogen atom as a hetero atom and a condensed ring derivative thereof such as 2,2'-diimidazolyl disulfide, 2,2'-dibenzimidazolyl disulfide, 2,2'-dibenzothiazolyl disulfide, 2,2'-dipurinyl disulfide and 2,2'-bis(1-azaazulenyl) disulfide.

As the solvent, any solvent which would not participate in the reaction can be used. In general, a halogenated hydrocarbon such as methylene chloride and chloroform, dimethylformamide, acetonitrile, etc. is preferably used. The process of this invention is generally carried out at room temperature but at a higher or lower temperature the reaction may also take place. The reaction time may vary depending upon the sort of the starting compound and reactant used and a reaction temperature. In general, from about several minutes to about tens of hours are required for completion of the reaction.

In the present invention, the disulfide participates in the reaction with each of the other starting materials and the tertiary phosphine at a molar ratio of 1:1:1 when the organic amine is used as one of the starting materials and at a molar ratio of 0.5:1:1 when the sulfenic acid amide is used. Practically, the reaction can, in most cases, be smoothly completed by employing a theoretical amount of the disulfide. But the reaction may be also conducted in the presence of an excess amount of the disulfide.

In the present invention, when the starting material tends to suffer from racemization, yield of optically pure compounds is improved by conducting the reaction in the presence of an acidic substance such as phenol, nitrophenol, phthalimide, succinimide, N-hydroxysuccinimide and N-hydroxyphthalimide.

After completion of the reaction, the desired product is isolated from the reaction mixture by conventional means. For instance, when a water-immiscible solvent is employed as the reaction solvent, the reaction mixture is washed with water only or successively with water, aqueous sodium bicarbonate, water, dilute hydrochloric acid and water and then dried. The solvent is distilled off and the residue is dissolved in a suitable solvent. The solution is subjected to chromatography using silica gel to give the desired product. When a water-miscible solvent is employed as the reaction solvent, the solvent is distilled off from the reaction mixture and the residue is dissolved in a water-immiscible solvent. The solution is treated with the same procedure as above to give the desired product.

In the present process, when the amide especially a peptide is to be synthesized by a solid phase method, one of the starting materials is bonded with an insoluble polymer such as a resin and polysaccharide and thus the whole reaction is naturally conducted in a heterogeneous phase, but the reaction conditions are the same as those in homogeneous phase.

The following examples are given for the purpose of the illustration of the present invention but should not be construed as a limitation on the scope thereof.

EXAMPLE 1

N-Benzoyl-L-leucylglycine ethyl ester (1) To a mixture of 1.17 g. of N-benzoyl-L-leucine, 1.10 g. of 2,2'-dipyridyl disulfide and 50 ml. of methylene chloride is added dropwise a solution of 1.31 g. of triphenylphosphine and 0.51 g. of glycine ethyl ester in 20 ml. of methylene chloride while stirring at room temperature over 5 minutes. After completion of the addition, the mixture is stirred at room temperature for 30 minutes. The reaction mixture is washed successively with water, a saturated aqueous sodium bicarbonate, water, 0.1 N hydrochloric acid and water and then dried over anhydrous sodium sulfate. The solvent is distilled off. The residue is dissolved in methylene chloride. The solution is subjected to column chromatography using silica gel and eluted with methylene chloride. Distillation of the solvent from the eluate gives 1.41 g. of the desired product.

Melting point: 154° C.

$[\alpha]_D^{20}$ —32.6° (C.=3.1, ethanol).

The above-mentioned procedure is repeated, substituting 1.49 g. of 2,2'-dibenzimidazolyl disulfide for the 2,2'-dipyridyl disulfide to give 1.35 g. of the desired product.

$[\alpha]_D^{20}$ —32.0° (C.=3.0, ethanol).

(2) To a solution of 2.35 g. of N-benzoyl-L-leucine, 2.56 g. of N-(2-nitrobenzenesulphenyl) glycine ethyl ester and 1.10 g. of 2,2'-dipyridyl disulfide in 50 ml. of methylene chloride is added dropwise a solution of 2.62 g. of triphenylphosphine in 10 ml. of methylene chloride while stirring at room temperature. After completion of the addition, the mixture is stirred at room temperature for 3 hours. The reaction mixture is washed successively with water, a saturated aqueous sodium bicarbonate, water, 0.1 N hydrochloric acid and water and then dried over anhydrous sodium sulfate. The solvent is distilled off. The residue is dissolved in methylene chloride. The solution is subjected to column chromatography using silica gel and eluted with methylene chloride. Distillation of the solvent from the eluate gives 2.78 g. of the desired product. Melting point: 154° C.

$[\alpha]_D^{20}$ —32.0° (C.=3.0, ethanol).

EXAMPLE 2

N-Benzyloxycarbonyl-L-methionylglycine ethyl ester

The procedure of above Example 1(1) is repeated, substituting 1.42 g. of N-benzyloxycarbonyl-L-methionine and 1.66 g. of 2,2'-dibenzothiazolyl disulfide for the N-benzoyl-L-leucine and the 2,2'-dipyridyl disulfide and prolonging the reaction time to 6 hours to give 1.62 g. of the desired product.

Melting point: 94–95° C.

$[\alpha]_D^{27}$ —19.7° (C.=4.6, ethanol).

EXAMPLE 3

N-Benzyloxycarbonyl-L-phenylalanylglycine ethyl ester (1) To a solution of 2.99 g. of N-benzyloxycarbonyl-L-phenylalanine, 2.56 g. of N-(2,4-dinitrobenzenesulphenyl)glycine ethyl ester and 1.66 g. of 2,2'-dibenzothiazolyl disulfide in 100 ml. of methylene chloride is added dropwise a solution of 2.02 g. of tri-n-butylphosphine in 10 ml. of methylene chloride while stirring at room temperature. After completion of the addition, the mixture is stirred at room temperature for 6 hours. The reaction mixture is treated with the same procedure as in Example 1(1) to give 2.91 g. of the desired product.

Melting point: 110° C.

$[\alpha]_D^{20}$ −17.0° (C.=2, ethanol).

(2) To a mixture of 1.50 g. of N-benzyloxycarbonyl-L-phenylalanine, 1.10 g. of 2,2'-dipyridyl disulfide and 50 ml. of methylene chloride is added dropwise a solution of 1.01 g. of tri-n-butyl phosphine and 0.51 g. of glycine ethyl ester in 20 ml. of methylene chloride while stirring at room temperature over 5 minutes. After completion of the addition, the mixture is stirred at room temperature for 30 minutes. The reaction mixture is treated with the same procedure as in Example 1(1) to give 1.45 g. of the desired product. Melting point: 110° C.

$[\alpha]_D^{20}$ −17.2° (C.=2.5, ethanol).

(3) The procedure as above Example 3(2) is repeated, substituting 1.10 g. of 4,4'-dipyridyl disulfide for the 2,2'-dipyridyl disulfide to give 1.30 g. of the desired product.

(4) The procedure of above Example 3(2) is repeated, substituting 1.55 g. of 5,5'-dinitro-2,2'-dipyridyl disulfide for the 2,2'-dipyridyl disulfide to give 1.28 g. of the desired product.

EXAMPLE 4

N-tert.-butoxycarbonyl-L-leucylglycine (solid phase method; preparation on resin)

(a) *N-tert.-amyloxycarbonylglycine resin.*—In 30 ml. of ethanol is suspended 10 g. of a 2% divinylbenzene-styrene copolymer containing 2.4 mmole/g. chloromethyl group and to the suspension are added 1.91 g. of N-tert.-amyloxycarbonylglycine and 1.64 g. of triethylamine. The mixture is heated under reflux for 24 hours. The reaction mixture is filtered and the resin is washed successively with ethanol, water and methanol and dried in a vacuum desiccator. The resin contains 0.317 mmole/g. of N-tert.-amyloxycarbonylglycine.

(b) *Glycine resin.*—2 g. of the resin obtained in (a) is added to 15 ml. of an acetic acid solution of 2 N hydrogen chloride and the mixture is shaken for 30 minutes. The reaction mixture is filtered and the resin is washed successively three times with each 15 ml. portion of acetic acid, two times with each 15 ml. portion of ethanol and three times with each 15 ml. portion of dimethylformamide. The glycine hydrochloride resin thus obtained is added to 15 ml. of dimethylformamide containing 1.6 ml. of triethylamine and the mixture is shaken for 10 minutes. The reaction mixture is filtered and the resin is washed successively three times with each 15 ml. portion of dimethylformamide and three times with each 15 ml. portion of methylene chloride to give glycine resin.

(c) *N-tert.-Butoxycarbonyl-L-leucylglycine resin (formation of amido bond).*—In 8 ml. of methylene chloride is dissolved 789 mg. of N-tert.-butoxycarbonyl-L-leucine monohydrate. This solution is added to the glycine resin obtained in (b) and the mixture is shaken for 5 minutes. To the mixture is added a solution of 498 mg. of triphenylphosphine and 418 mg. of 2,2'-dipyridyl disulfide in 7 ml. of methylene chloride and the mixture is shaken for 6 hours. The reaction mixture is filtered and the resin is washed successively three times with each 15 ml. portion of methylene chloride and three times with each 15 ml. portion of ethanol and then dried in a vacuum desiccator to give N-tert.-butoxycarbonyl-L-leucylglycine resin.

(d) *L-Leucylglycine (confirmation of polypeptide bond formation).*—The resin obtained in (c) is suspended in 20 ml. of trifluoroacetic acid and into the suspension is bubbled dry hydrogen bromide for 30 minutes.

The trifluoroacetic acid is distilled off from the reaction mixture under reduced pressure and the residue is extracted three times with each 15 ml. portion of water. The extract is subjected to column chromatography using diethylaminoethylcellulose and eluted with water. The solvent is distilled oc from the eluate and the residue is dried by heating at 100° C. for 2 hours to give L-leucylglycine.

Melting point 233–240° C. (with decomposition).

$[\alpha]_D^{20}$ 85.7° (C.=2, water).

EXAMPLE 5

N-Benzyloxycarbonyl-D-α-aminobenzylpenicillin

In 20 ml. of methylene chloride is suspended 2.85 g. of N-benzyloxycarbonyl-D-phenylglycine and to the suspension is added dropwise a solution of 2.62 g. of triphenylphosphine and 2.20 g. of 2,2'-dipyridyl disulfide in 20 ml. of methylene chloride while stirring at 0° C. Then, to the mixture is added dropwise a solution of 3.20 g. of triethylamine salt of 6-aminopenicillanic acid in 10 ml. of methylene chloride. After completion of the addition, the mixture is stirred at room temperature for one hour. The solvent is distilled off from the reaction mixture and the residue is dissolved in ethyl acetate and the solution is extracted with a 3% sodium bicarbonate solution. The extract is adjusted to pH 2 by addition of conc. hydrochloric acid and extracted with ether. The ether extract is washed with water and dried over anhydrous sodium sulfate. The solvent is distilled off to give 4 g. of N-benzyloxycarbonyl-D-α-aminobenzylpenicillin. To 30 ml. of a mixture of water and methanol (1:1) are added 2.41 g. of N-benzyloxycarbonyl-D - α - aminobenzylpenicillin and 7.23 g. of 20% palladium on carbon. The mixture is shaken in hydrogen atmosphere for 20 minutes. The catalyst is removed from the reaction mixture by filtration and the filtrate is adjusted to pH 2 and extracted with ether. The aqueous solution is adjusted to pH 4.8 to give precipitates of D-α-aminobenzylpenicillin trihydrate.

EXAMPLE 6

N-Benzyloxycarbonyl-D-α-aminobenzylpenicillin phenacyl ester

In 20 ml. of methylene chloride is suspended 2.85 g. of N-benzyloxycarbonyl-D-phenylglycine and 3.70 g. of 6-aminopenicillanic acid phenacyl ester hydrochloride and to the suspension is added dropwise a solution of 1.01 g. of triethylamine in 10 ml. of methylene chloride at 0° C. To the mixture is added dropwise a solution of 2.62 g. of triphenylphosphine and 2.20 g. of 2,2'-dipyridyl disulfide in 20 ml. of methylene chloride at 0° C. After completion of the addition, the mixture is stirred at room temperature for 3 hours. The reaction mixture is washed successively with 3% sodium bicarbonate solution, water, 0.01 N hydrochloric acid and water and then dried over anhydrous sodium sulfate. The solvent is distilled off and the residue is dissolved in benzene. The solution is subjected to column chromatography using silica gel and eluted with at first benzene and then a mixture of ethyl acetate and benzene (9:1). Distillation of the solvent from the latter eluate gives 3.66 g. of the desired product.

Melting point: 171° C. (with decomposition).

$[\alpha]_D^{25}$ +126.9° (C.=1, ethyl acetate).

*Analysis.*—Calculated for $C_{32}H_{31}O_7N_3S$: C, 63.90; H, 5.20; N, 7.00; S, 5.34. Found: C, 64.15; H, 5.15; N, 6.79; S, 5.19.

What is claimed is:

1. In the process for the preparation of an antibiotic selected from the group consisting of a penicillin, cephalosporin and polymyxin, wherein an amino carboxylic acid precursor is reacted with a precursor organic amine or a sulfenic acid amide thereof, the improvement which comprises conducting said reaction in the presence of a tertiary phosphine and a disulfide of a mercaptoheterocyclic compound containing a nitrogen-carbon double bond with which the disulfide linkage is conjugated.

2. A process according to Claim 1, wherein the antibiotic is N-benzyloxycarbonyl-D-α-aminobenzylpenicillin phenacyl ester, the amino carboxylic acid is 6-aminopenicillanic acid phenacyl ester, and the amine is N-benzyloxycarbonyl-D-phenylglycine.

3. A process as claimed in Claim 1 wherein said disulfide is selected from the group consisting of 3,3'-dipyridyl disulfide, 4,4'-dipyridyl disulfide, 5,5'-dinitro-2,2'-dipyridyl disulfide and 2,2'-dibenzothiazolyl disulfide.

4. A process as claimed in Claim 1 wherein said tertiary phosphine is trialkyl phosphine or triphenyl phosphine.

5. A process according to Claim 1, wherein the antibiotic is 6-aminopenicillanic acid or the phenacyl ester thereof.

6. A process according to Claim 1, wherein the antibiotic is N - benzyloxycarbonyl-D-α-aminobenzylpenicillin, the amino carboxylic acid is 6-aminopenicillanic acid and the amine is N-benzyloxycarbonyl-D-phenylglycine.

References Cited
UNITED STATES PATENTS

| | | | |
|---|---|---|---|
| 3,737,423 | 6/1973 | Mukaiyama et al. | 260—112.5 |
| 3,553,202 | 1/1971 | Hatt et al. | 260—239.1 |
| 3,520,876 | 7/1970 | Alburn et al. | 260—239.1 |

LEWIS GOTTS, Primary Examiner

R. J. SUYAT, Assistant Examiner

U.S. Cl. X.R.

260—239.1, 557 R, 558 S, 558 A

UNITED STATES PATENT OFFICE
CERTIFICATE OF CORRECTION

PATENT NO. : 3,830,794
DATED : August 21, 1974
INVENTOR(S) : TERUAKI MUKAIYAMA et al It is certified that error appears in the above-identified patent and that said Letters Patent are hereby corrected as shown below:

Column 1, line 8, after "Ser. No. 316,013", insert the following:

--- Claims priority, application Japan Nov. 19, 1969, 92685/69 --- .

Column 5, line 2: before " α ", replace "1" with --- [ --- .

Column 5, line 74: replace "or" with --- off --- .

Signed and Sealed this ninth Day of September 1975

[SEAL]

Attest:

RUTH C. MASON
Attesting Officer

C. MARSHALL DANN
Commissioner of Patents and Trademarks